(12) United States Patent
Pantus

(10) Patent No.: US 9,928,705 B2
(45) Date of Patent: Mar. 27, 2018

(54) THREAT DETECTION SYSTEM

(71) Applicant: UTC Fire & Security Corporation, Farmington, CT (US)

(72) Inventor: Mathias Pantus, Farmington, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 0 days.

(21) Appl. No.: 15/174,542

(22) Filed: Jun. 6, 2016

(65) Prior Publication Data

US 2016/0371946 A1    Dec. 22, 2016

Related U.S. Application Data

(60) Provisional application No. 62/180,375, filed on Jun. 16, 2015.

(51) Int. Cl.
G08B 29/00       (2006.01)
G08B 13/16       (2006.01)
(Continued)

(52) U.S. Cl.
CPC .......... G08B 13/1663 (2013.01); G01H 9/00 (2013.01); G01V 1/226 (2013.01); G01V 1/008 (2013.01)

(58) Field of Classification Search
CPC ............................ G08B 13/1663; G01C 19/72
(Continued)

(56) References Cited

U.S. PATENT DOCUMENTS 6,240,783 B1    6/2001   McGugin et al.
6,955,085 B2   10/2005   Jones et al.
(Continued)

FOREIGN PATENT DOCUMENTS

DE         2503633       8/1975
DE     102004034005      2/2006
(Continued)

OTHER PUBLICATIONS

Extended European Search Report for European Patent Application No. 16174647.4, dated Feb. 2, 2017.
(Continued)

*Primary Examiner* — Tai T Nguyen
(74) *Attorney, Agent, or Firm* — Locke Lord LLP; Scott D. Wofsy; Joshua L. Jones

(57) ABSTRACT

A system for detecting a structural change to a structure is provided, wherein an exciter is positioned at a first location of the structure to transmit an excitation signal that is based on a reference signal and to apply the excitation signal to the structure. An accelerometer is positioned at a second location of the structure to sense the excitation signal after it has propagated to the second location. The accelerometer outputs an electrical signal that represents seismic activity applied to the structure by the excitation signal. A signal processing component is synchronized with the reference signal and receives the electrical signal. The signal processing component is configured to use the reference signal to extract portions of the electrical signal that are synchronized with the reference signal, and to output phase and amplitude values of the extracted portion. A computer is operatively connected to the signal processing component to compare the output phase and amplitude values to structural damage signals indicative of structural damages stored in a database for determining whether the signal is indicative of a change in the structure.

11 Claims, 3 Drawing Sheets

(51) Int. Cl.
*G01H 9/00* (2006.01)
*G01V 1/22* (2006.01)
*G01V 1/00* (2006.01)

(58) Field of Classification Search
USPC ...... 340/506, 690, 669, 853.9, 854.9, 885.9; 73/514.26, 653
See application file for complete search history.

(56) References Cited

U.S. PATENT DOCUMENTS

| | | | |
|---|---|---|---|
| 7,122,783 | B1 | 10/2006 | Pastore, Jr. et al. |
| 7,222,534 | B2 | 5/2007 | Maas et al. |
| 7,243,543 | B2 | 7/2007 | Berg et al. |
| 7,254,999 | B2 | 8/2007 | Bostick, III |
| 7,564,540 | B2 | 7/2009 | Paulson |
| 7,864,329 | B2 | 1/2011 | Berthold |
| 8,605,542 | B2 | 12/2013 | Coates et al. |
| 8,726,732 | B2 | 5/2014 | Littler et al. |
| 8,770,024 | B1 | 7/2014 | Paritsky et al. |
| 2010/0231919 | A1* | 9/2010 | Schreiber ............ G01M 5/0091 356/460 |
| 2011/0037588 | A1 | 2/2011 | Zeng et al. |
| 2011/0149078 | A1 | 6/2011 | Fan et al. |
| 2011/0320147 | A1 | 12/2011 | Brady et al. |
| 2012/0035854 | A1 | 2/2012 | Kragh et al. |
| 2015/0355015 | A1* | 12/2015 | Crickmore ............ G01H 9/004 73/655 |
| 2015/0355050 | A1* | 12/2015 | Yoshida ............ G01M 5/0033 702/56 |
| 2016/0202285 | A1* | 7/2016 | Wang ............ G01H 9/004 250/227.14 |

FOREIGN PATENT DOCUMENTS

| | | |
|---|---|---|
| JP | S60207012 | 10/1985 |
| WO | WO-2012155460 | 11/2012 |

OTHER PUBLICATIONS

Siemens Switzerland Ltd., Intrusion, Intrunet seismic detectors 24/7 protection of and valuables; Answers for infrastructure; www.seimens.com/intrunet.

Cosmotron AB, Cosmotron VVS 302, Vibration Detector of ATM's and Night Safe Deposit Boxes, Pro info—Sep. 1998.

General Electric, GE Sensors, DV Series Vault/Safe/ATM Sensors; © GE Interlogix, C-3549-5000KA-0040; www.GE-Interlogix.com <http://www.GE-Interlogix.com>.

* cited by examiner

THREAT DETECTION SYSTEM

CROSS-REFERENCE TO RELATED APPLICATION

This application claims the benefit of priority under 35 U.S.C. § 119(e) to U.S. Provisional Application No. 62/180,375, filed Jun. 15, 2015, which is incorporated herein by reference in its entirety.

BACKGROUND OF THE INVENTION

1. Field of the Invention

The present invention is directed to the field of security, and more particularly, to a threat detection and alarm system.

2. Description of Related Art

For intrusion detection and more specifically to detect penetration of strong rooms, safes, vaults, or automated teller machines (ATM), it is oftentimes desirable to detect not only activity impacting the vault indicating the presence of an attack, but also to detect the initial attempts at penetration of the vault. Typical intrusion detection systems utilize air-conducted acoustic waves in which active ultrasonic detectors or passive acoustic detectors are utilized in the surveillance of a protected area. Moreover, some systems utilize microwave energy projected into the protected area, variations in which are detected to determine an alarm condition.

It will be appreciated that once an intruder has penetrated a protected area, such as the vault, it is oftentimes too late for an alarm indication to be of real use because of the immediate accessibility of the valuables being protected. It is therefore necessary in a wide variety of cases to provide "early warning" of a vault penetration so that appropriate early countermeasures may be taken.

While vault activity detectors have been utilized in the past, it is with difficulty that ordinary sounds and vibrations can be distinguished from those which indicate an unauthorized penetration or attempted penetration of the vault, safe, strong room, or ATM. Thus sensing ordinary sounds and vibrations alone may result in a relatively high false alarm rate.

Such conventional methods and systems have generally been considered satisfactory for their intended purpose. However, there is still a need in the art for an improved detection system. The present disclosure provides a solution for this need.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for measuring seismic activity to detect a threat to a structure is described. The system includes an optical accelerometer configured to be mounted to the structure and a computer. The optical accelerometer outputs an electrical signal that represents modulation of light, wherein the modulation of the light is caused by seismic activity affecting the structure. The computer is operatively connected to the accelerometer to compare the electrical signal to a plurality of seismic activity signals indicative of seismic activity associated with structures stored in a database for determining whether the electrical signal is indicative of a threat.

In embodiments, the optical accelerometer can include a light source to direct light signals through a first light path, a modulator formed of a supple, resilient material that can deform in response to seismic activity, wherein the modulator can be positioned to modulate a light signal propagating through the first light path in response to the deformation. The optical accelerometer can further include a photoreceiver positioned in a second light path to receive the modulated light signal.

In embodiments, the first light path and the second light paths can be conical or cylindrical bores defined through a sensor body. The first light path can converge towards the modulator and the second light path can diverge away from the modulator. An exterior wall of at least one of the first light path and the second light path can define a gap, and a top surface of the modulator can define the diameter of at least one of the first and second light paths.

In embodiments, the light source can be modulated to cause the light signals generated by the light source to be distinguishable from ambient light. In addition, the computer can assign the electrical signal output by the optical accelerometer a categorization that indicates whether the electrical signal is a threat or a benign source, and can store values associated with characteristics of the electrical signal output by the accelerometer in the database as a seismic activity signal in association with the categorization. The computer can be configured to activate an alarm when the computer determines that the light signal indicates a threat.

In further, optional aspects, a first system for detecting a structural change to a structure is described. The first system includes an exciter, an accelerometer, a signal processing component, and a computer. The exciter is positioned at a first location of the structure to transmit an excitation signal that is based on a reference signal and to apply the excitation signal to the structure. The accelerometer is positioned at a second location of the structure to sense the excitation signal after it has propagated to the second location. The accelerometer outputs an electrical signal based on seismic activity applied to the structure by the excitation signal. The signal processing component is synchronized with the reference signal and receives the electrical signal. The signal processing component is configured to use the reference signal to extract portions of the electrical signal that are synchronized with the reference signal, and to output phase and amplitude values of the extracted portion. The computer is operatively connected to the signal processing component to evaluate the output phase and amplitude values using predetermined threshold values that indicate a change in the structure.

In embodiments, the first system can communicate with a second system for detecting a structural change by at least one of sensing at the second location an excitation signal transmitted by the second system from a third location that is remote from the first system, and transmitting an excitation signal at the second location for receipt by the second system at a fourth location that is remote from the first system. At least one of the first system and the second system can exchange data with a host computer by a communication link, wherein at least one of, the first system receives the data from the second system and transmits it to the host computer, and the first system receives the data from the host computer and transmits it to the second system.

In embodiments, the first system can further include a modulator and a demodulator. The modulator can modulate the exciter signal with a first modulation scheme and the modulated exciter signal is applied to the structure. The demodulator can demodulate the phase and amplitude values using this first modulation scheme. The signal processing component can include a lock-in amplifier. The excitation signal can be a subliminal signal. A detected change in the structure is associated with at least one of structural damage or deterioration from use.

In further, optional aspects, a method for detecting a structural change to a structure is described. The method includes applying at a first location of a structure an excitation signal that is based on a reference signal to the structure, sensing the excitation signal at a second location of the structure, and outputting a modulated signal based on seismic activity applied to the structure by the excitation signal. The method further includes extracting from the modulated signal using the reference signal portions of the modulated signal that are not synchronized with the reference signal and outputting phase and amplitude values of the extracted portion. The method further includes comparing the output phase and amplitude values to a plurality of structural damage signals indicative of structural damage stored in a database, and determining, based on the comparison, whether the modulated signal is indicative of a change in the structure.

In embodiments, the method can further include modulating the exciter signal with a first modulation scheme and the modulated exciter signal is applied to the structure, and demodulating the phase and amplitude values using the first modulation scheme. The method can further include comparing the determination whether the modulated signal is indicative of a change in the structure with a second determination whether the modulated signal is indicative of a change in the structure that is based on a second excitation signal, and determining whether to activate an alarm indicating an occurrence of change in the structure based on the comparison with the second determination.

The method can further include categorizing the phase and amplitude values with an indication of whether the phase and amplitude are indicative of a structural change, and storing the phase and amplitude values in the database in association with the categorization.

In further, optional aspects, an optical accelerometer is described. The accelerometer includes a body configured to be mounted to a structure and a transducer to output an electrical signal that represents modulation of light, the modulation of the light being caused by seismic activity affecting the structure.

In embodiments, the transducer can include a light source to direct light signals through a first light path and a modulator formed of a resilient material that is configured to deform in response to seismic activity, the modulator positioned so that when a light signal propagates through the first light path, the modulator is configured to modulate the light signal in response to the deformation. The transducer can further include a photoreceiver positioned in a second light path to receive the modulated light signal and output an electrical signal that represents the modulated light signal.

In embodiments, the first light path and the second light paths can be conical or cylindrical bores defined through a sensor body. The optical accelerometer: the first light path can converge towards the modulator, and the second light path can diverge away from the modulator. An exterior wall of at least one of the first light path and the second light path can define a gap, and a top surface of the modulator can define the diameter of at least one of the first and second light paths.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Figure 1:
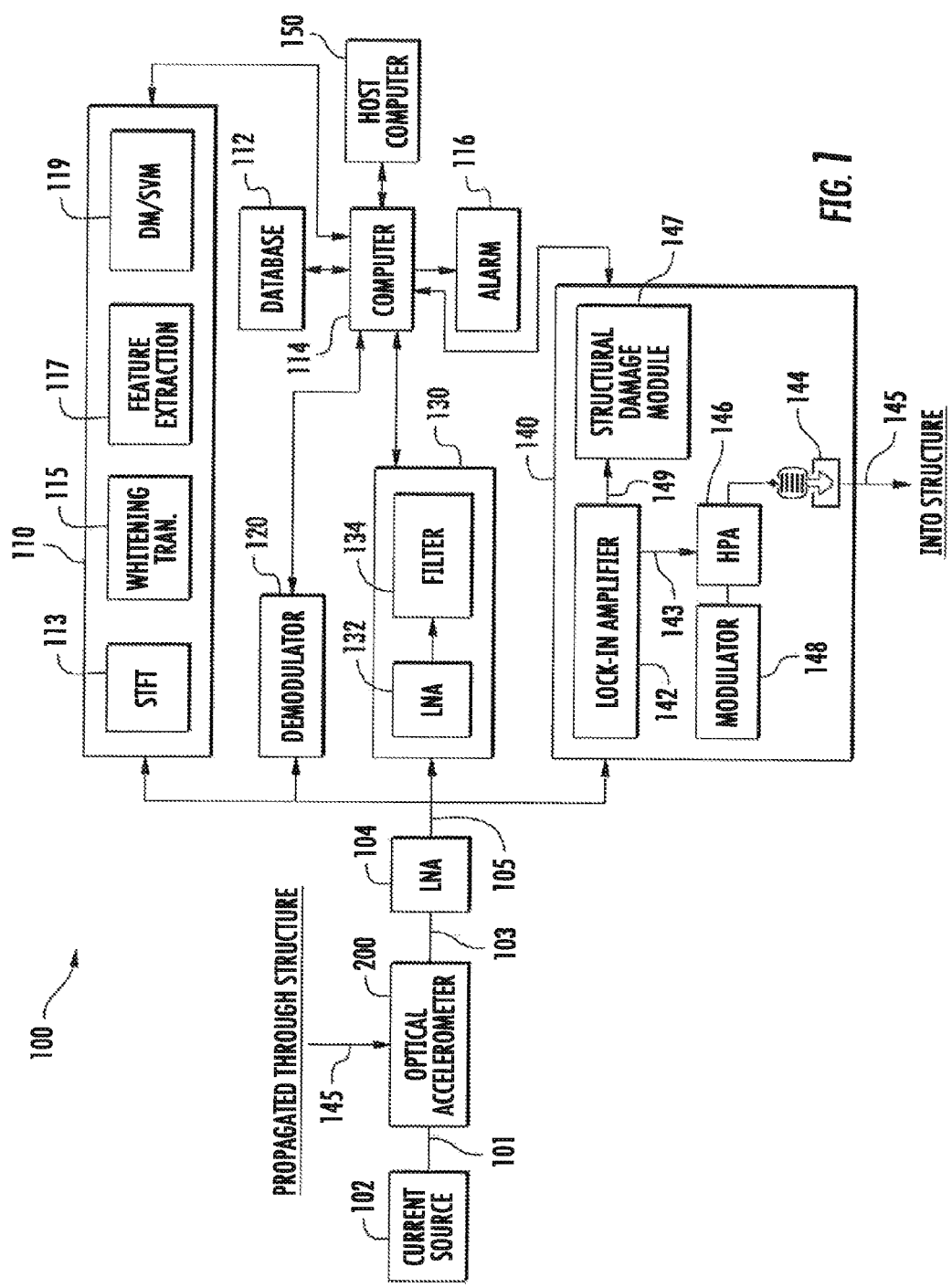
FIG. 1 is a block diagram of an exemplary embodiment of a threat detection system constructed in accordance with the present disclosure, showing an optical accelerometer operatively coupled to a selectivity module.

Reference will now be made to the drawings wherein like reference numerals identify similar structural features or aspects of the subject disclosure. For purposes of explanation and illustration, and not limitation, a partial view of an exemplary embodiment of a threat detection system in accordance with the disclosure is shown in FIG. 1 and is designated generally by reference character 100. Other embodiments of the threat detection system in accordance with the disclosure, or aspects thereof, are provided in FIG. 2-3, as will be described.

An optical accelerometer 200 of the threat detection system 100 is mounted onto a wall inside a safe, vault, strong room, automated teller machine, or the like. The optical accelerometer 200 is positioned to detect the seismic activity that occurs during an intrusion or attack. Seismic activity can include seismic vibrations, motion speed, and motion acceleration. More specifically, the optical accelerometer 200 is arranged to detect structure-borne indications of intrusion such as would accompany attempts at forced entry involving oxygen lances, diamond saws, drills, sledge hammers, and the like. The optical accelerometer 200 senses seismic activity of a structure, while remaining relatively immune to airborne activity, such as ambient noise. The immunity to airborne activity is a function of several factors. In accordance with one factor, the inertia mass of the optical accelerometer 200 reflects sound. In accordance with another factor, the optical accelerometer 200 operates as a transceiver that reacts to photons, not sound pressure. In accordance with a further factor, the selectivity module 110 (described further below) can perform machine learning and can identify and categorize sounds and reject sounds that are categorized as benign.

With reference to FIG. 1, a block diagram of the threat detection system 100 is shown. A current source 102, outputs a current signal 101. The current signal 101 can be modulated, such as by a direct current, sine wave modulation, fixed frequency square wave modulation, or square wave with a random repetition rate, or the like. The current signal 101 is fed into a light source 202 (see FIG. 2) of the optical accelerometer 200. A light signal output from the light source 202 is modulated in accordance with the modulation of the signal output by the current source 102. These modulations are also referred to as source modulations. The source modulation of the source light signal output by the light source 202 distinguishes the source light signal from ambient signals, such as ambient light and electromagnetic fields.

In embodiments, a different type of accelerometer, such as a piezo, MEMS, capacitive, or resistive accelerometer can be used instead of the optical accelerometer 200. The accelerometer to be used can detect seismic activity and output an electrical signal that has amplitudes indicative of the sensed vibration, motion speed, or motion acceleration.

Seismic vibrations, motion speed, and motion acceleration associated with seismic activity that is detected by the optical accelerometer 200 is transduced into optical variations. An electrical output signal 103 that is output by a photoreceiver 230 of accelerometer 200 (shown in FIG. 2 and described below in a detailed description of the accelerometer 200) is further modulated by modulations that correlate to the seismic activity (herein referred to as seismic modulations). Accordingly, the electrical output signal 103 can include source modulations and seismic modulations. The source modulation acts as a predetermined and coherent signal, acting similar to a "carrier wave," that can be detected during demodulation. The seismic modulations cause non-coherent modulation outputs that are not suppressed, enabling extraction of seismic activity information.

The modulated electrical output signal 103 is passed to a low noise amplifier (LNA) 104. The LNA 104 can include a gating or blanking input that turns off and on the LNA's gain, which enables synchronous voltage detection and squaring. The LNA 104 produces an amplified signal 105 which is processed in series (without limitation to the order), parallel, or a combination thereof, by at least one of several modules, including a selectivity module 110, a demodulator module 120, a differential module 130, and a seismic active monitor module 140 to determine whether the seismic modulations of the amplified signal 105 indicate a threat (e.g., an intrusion attempt, an actual intrusion, an attack). In other words, the determination can distinguish whether the seismic activity causing the seismic modulation is associated with a threat or is benign.

The communication links between the accelerometer, modules 110, 120, 130, 140, and the computer 114 shown in FIG. 1 are illustrated examples, and the disclosure is not limited to the configuration of the communication links illustrated. The output from the selectivity module 110, demodulator module 120, differential module 130, and seismic active monitor module 140 can be transmitted directly or indirectly to the computer 114, to the database 112 so that it can be accessed by the other modules 110, 120, 130, 140 and the computer 114, and/or to another module of modules 110, 120, 130, 140. For example, the output of modules 110, 120, 130, and/or 140 can be stored as new event data in association with a new event that is stored in the database 112. Once stored in database 112 and analyzed by the computer 114, the new event data can be associated with a categorization that indicates the type of seismic event that was sensed by optical accelerometer 200, including whether the seismic event is associated with a threat or is benign.

The computer 114 demodulates the new event data based on the source modulation. The demodulation can be performed using a synchronous detection algorithm to condition, recover, and detect the current source pulses and quantify magnitude and fluctuations, e.g., associated with gating.

Modules 110, 120, 130, 140, and operations performed by computer 114 can be implemented using software, firmware, hardware, or a combination thereof, and may include a software algorithm, program or code residing on a computer useable medium having control logic for enabling execution on a machine having a computer processor, such as computer 114. The machine typically includes memory storage configured to provide output from execution of the computer algorithm or program.

As used herein, the term "software" is meant to be synonymous with any code or program that can be in a processor of a host computer 150, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

It will be understood that such acts and operations which can be computer-executed, include the manipulation by the computer 114 of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

It is to be further appreciated that embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices. Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

A generalized computer embodiment generally comprises at least one computer processor, memory, at least one input device and at least one output device, coupled together via a bus or group of buses. In certain embodiments, the input device and output device could be the same device. An interface, such as a PCI card or PC card, can also be provided for coupling the processing system to one or more peripheral devices. At least one storage device which houses at least one database, such as database 112 is also provided. The memory can be any form of memory device, for example, volatile or non-volatile memory, solid state storage devices, magnetic devices, etc. The processor could comprise more than one distinct processing device, for example to handle different functions within the processing system. The input device receives input data and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data could come from different sources, for example keyboard instructions in conjunction with data received via a network. The output device produces or generates output data and can comprise, for example, a display device or monitor in which case output data is visual, a printer in which case output data is printed, a port for example a USB port, a peripheral component adaptor, a data transmitter or antenna such as a modem or wireless network adaptor, etc. The output data could be distinct and derived from different output devices, for example a visual display on a monitor in conjunction with data transmitted to a network. A user could view data output, or an interpretation of the data output, on, for example, a monitor or using a printer. The storage device can be any form of data or information storage means, for example, volatile or non-volatile memory, solid state storage devices, magnetic devices, etc.

In use, the processing system is adapted to allow data or information to be stored in and/or retrieved from, via wired or wireless communication means, database 112. The interface may allow wired and/or wireless communication between the processing unit and peripheral components that may serve a specialized purpose. Preferably, the processor receives instructions as input data via input device and can display processed results or other output to a user by utilizing output device. More than one input device and/or output device can be provided. It should be appreciated that the processing system may be any form of terminal, server, specialized hardware, or the like.

It is to be appreciated that the processing system may be a part of a networked communications system. Processing system could connect to a network, for example the Internet or a WAN. Input data and output data could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment may operate in a networked environment using logical connections to one or more remote computers. The remote computer may be a personal computer, a tablet device, smart phone device, a server, a router, a network PC, a peer device, or other common network node, and typically includes many or all of the elements described above.

It is to be further appreciated that the logical connections can include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the computing system environment is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism.

In addition, a network can be formed with a plurality of threat detection systems 100 that communicate through a structure that is under surveillance by transmitting vibratory signals into the structure, the signals being electrical signals that were transduced into vibratory excitation signals, or receiving vibratory signals that travelled through the structure and transducing the vibratory signals into electrical signals. In a networked environment, program modules depicted relative to the computing system environment, or portions thereof, may be stored in a remote memory storage device. It is to be appreciated that the network connections are exemplary and other means of establishing a communications link between multiple computers may be used.

The computer environment as described is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

It is to be further appreciated, embodiments may be implemented with numerous other general-purpose or special-purpose computing devices and computing system environments or configurations. Examples of well-known computing systems, environments, and configurations that may be suitable for use with an embodiment, for example, as a host computer 150, include, but are not limited to, personal computers, handheld or laptop devices, personal digital assistants, tablet devices, smart phone devices, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types.

An embodiment may also be practiced in a distributed computing environment where tasks are performed by remote processing devices that are linked through a communications network. In a distributed computing environment, program modules may be located in both local and remote computer storage media including memory storage devices.

The selectivity module 110 is operatively connected to the accelerometer 200. The selectivity module 110 can include one or more suitable signal transformation units to help identify, filter out, and/or extract significant features of the amplified signal 105. Examples of signal processing modules that can be included in the selectivity module 110 include a short-term Fourier transformation (STFT) 113, a whitening transformation 115, a feature extraction 117, and/or a support vector transformation (DM/SVM) 119. Further examples of signal processing modules (not shown) that can be included in the selectivity module 110 include modules that perform a wavelet transform and Cepstrum analysis. The disclosure is not limited to the example modules 113, 115, 117, and 119, and modules that employ similar or different signal processing techniques are envisioned.

The STFT 113 can calculate a three-dimensional spectrogram matrix, wherein the X-axis corresponds to time, the Y-axis corresponds to frequency, and the Z-axis corresponds to signal power. Consistent frequency rows can be nullified, providing a graphical display that corresponds to the seismic activity. The whitening transformation 115 removes any consistent signals, for example, HVAC motors, elevator motors, ceiling fans, transformers humming, and oscillating fans that are not indications of a threat.

These consistent signals are narrow-band in the frequency-domain and are identifiable in the spectrogram. On the other hand, signals indicative of a threat are wide-band signals, such as caused by grinding, hammering, chiseling, and drilling. To illustrate, benign signals, such as signals associated with geo-seismic events and weather-events, typically have low frequencies. Signals associated with attacks, such as grinding, drilling, and oxygen-lance burning, typically have high frequencies and/or stronger crest factors. Signals associated with an explosion have an ultra-wide frequency band, wherein all of the frequencies occur during the same time interval, also referred to as a "pulse." The high-frequency or wide-band signals can be identified by filtering out the low-frequency and/or narrow-band signals as a result of the whitening algorithm 115.

The DM/SVM decision making and support vector machine algorithms 119 include machine learning algorithms. A plurality of time, frequency, and radiometric features are extracted from the amplified signal 105 and compared to signals of known events. The SVM learns patterns used for categorization to predict the type of activity occurring.

The computer 114 compares the features of the amplified signal 105 that were filtered, extracted, and/or identified by the selectivity module 110 to a plurality of vibration signals stored in the database 112 for determining whether the amplified signal 105 is indicative of a threat. If the amplified signal 105 corresponds to seismic activity stored in the database 112 that is known to indicate a possible threat, for example, an intrusion, attack, explosion, hammering, drilling, or chiseling, the computer 114 causes an alarm 116 or notification to be activated to indicate that an intrusion is underway. If, however, the amplified signal 105 corresponds to seismic activity known in the database 112 to indicate a benign source, for example, someone sweeping an adjacent sidewalk, music, voices, or a cash register beeping, no alarm action is taken. In this manner, the activation of the alarm 116 can be almost instantaneous with the detected attack activity, and well before the occurrence of a successful intrusion or security breach.

The database 112 includes data representative of potential threat events and benign events, as reported by experts. For example, if the threat detection system 100 is being used to detect attacks on an outdoor ATM, the database 112 can be populated with vibrational signals that relate to typical ATM street environment and weather events, such as rain or thunder. In addition, vibrational signals which relate to ambient noises, such as drilling occurring nearby during road construction can be stored in the database 112. Benign events can be associated with ATM intrinsic signals, for example, signals associated with vibrations caused by its printing actions (customer receipt, bank status, etc.), or cash dispensing mechanism. Database 112 can also include data which corresponds to typical threats, such as attacks on ATMs.

Further, the database 112 allows for continuous learning for improvement of the threat detection system 100. In order to continue improving the threat detection system 100, the threat detection system 100 is configured for learning by capturing events, creating profiles, and adding the profiles to the database 112. For example, when the electrical signal output by optical accelerometer 103 is detected, the computer 114 can assign a categorization to the amplified signal 105 that indicates whether the electrical signal originates from a threat or a benign source. The computer 114 can store in database 112 values associated with characteristics of the electrical signal in association with the categorization. The database entry, including the category assigned, can further be confirmed or updated with relevant information. Accordingly, the new database entry can be compared to newly received amplified signals 105 that are associated with newly sensed events in order to categorize the newly received amplified signals 105.

Several events can be stored in memory for diagnostic purposes. These novel events can be later referenced, downloaded, and reviewed by an expert to determine if a particular event is useful to improve the database 112. If each addition of a profile requires deletion of a previously stored event, an automated decision can be made so that the least useful event is replaced with the new event. For example, events associated with missed detections or with false alarms that had been added to the database 112 can be subsequently removed. By adding the most useful events to the database 112, the system's learning process yields increasingly accurate results as time progresses, driving continuous improvement of the threat detection system 100.

The demodulator module 120 is operatively connected to the optical accelerometer 200 to receive and demodulate the amplified signal 105 and output a demodulated signal 107. The demodulator module 120 can use phase-shift keying (PSK), amplitude keying, quadrature amplitude modulation (QAM), and/or a frequency-shift keying (FSK), or the like, to demodulate the amplified signal 105. The demodulator module 120 demodulates the modulation applied to reference signal 143, which is described in further detail below. The demodulation extracts from the amplified signal 105 a signal that is modulated by the seismic signal 145 as caused by exciter 144. The demodulated signal 107, which includes the seismic modulation, can be stored in the database 112.

The differential module 130 determines the type of seismic activity indicated by the amplified signal 105. In other words, at least one high pass filter 134 operatively connected to a LNA 132 differentiates the amplified signals 105 and categorizes the type of seismic activity, for example, by outputting a signal indicative of an explosion. The high pass filter 134 converts the velocity data derived from the amplified signals 105 into acceleration values, which allows for categorization.

The selectivity, communication and differential modules 110, 120, and 130 provide a passive mode of the system in that these modules react to detected vibration signals. The amplifier module 140 introduces an active mode by exciting, continually or periodically, the structure under surveillance with an excitation signal, and continuously sensing the excitation signal after it has passed through the structure to ascertain structural integrity and test for structural damage.

The amplifier module 140 generates an excitation signal using a reference signal, and detects information included in a sensed signal relative to the reference signal. The amplifier module 140 can include analog, digital, and/or software signal processing components, such as a lock-in amplifier 142 that can be implemented as an analog device, digital device, or using a microcontroller and/or digital processor. The lock-in amplifier 142, or an external source, generates a reference signal 143 that is provided to an exciter device 144. Operation of the lock-in amplifier 142 is synchronized with the reference signal 143.

The exciter device 144 generates an excitation signal 145 that is based on the reference signal 143. The exciter device 144 is positioned at a first location of the structure so that the excitation signal 145 is applied to the structure at the first location. The excitation signal 145 propagates through the structure and is sensed by the optical accelerometer 200 at a second location of the structure. The optical accelerometer 200 outputs an electrical output signal 103 that corresponds to sensing of the excitation signal 145 by the optical accelerometer 200. The lock-in amplifier 142 receives an amplified signal 105 that corresponds to the electrical output signal 103, and thus the excitation signal 145.

Thus, amplified signal 105 is based on propagation of the excitation signal 145 through the structure and sensed by the optical accelerometer 200, and is therefore synchronized with the reference signal 143. Operation of the lock-in amplifier 142, which is synchronized with the reference signal 143, is therefore also synchronized with the amplified signal 105. The seismic modulation of the amplified signal 105 can be extracted from the amplified signal 105 using the reference signal 143.

The lock-in amplifier 142 outputs phase and amplitude values associated with an extracted signal 149 that corresponds to the phase and amplitude values of the coherent vibrations of exciter 144. Since signals associated with seismic activity are non-coherent, a lock-in amplifier cannot extract phase information without having a reference. Further, amplitude information can be weak and unreliable. The lock-in amplifier 142 can be operatively connected to the exciter 144 through a high power amplifier 146 that amplifies the reference signal 143. The exciter 144 can output the excitation signal 145 as a continual or intermittent vibration signal that is based on the known reference signal 143 such that the seismic modulation can be distinguished and extracted.

The excitation signal 145 is subliminal so that it is substantially concealed audibly and tactilely to a person located in the vicinity of the structure or that touches the structure. The excitation signal 145 can be detected once it has propagated through the structure under surveillance. A change of seismic propagation through the structure causes amplitudes and phases to drift away from predetermined values. Detection of a drift in seismic propagation values indicates that the structure under surveillance is altered and possibly deliberately (e.g., by attack) or accidentally (e.g., by flooding or earthquake) damaged.

The high power amplifier 146 can be operatively connected to a modulator 148. Modulator 148 can use any modulation method. Some examples include PSK, FSK, QAM, and on-off key (OOK) modulation. The modulator 148 deliberately modulates the exciter signal 145. The modulator 148 of the amplifier module 140 and the demodulator 120 together enable modulating and demodulating for transmission and modulation of the vibration signals (the excitation signal 145 and the amplified signal 105) which communicate through the structure regardless of material of the structure, e.g., steel, concrete, laminates.

The lock-in amplifier 142 provides the extracted signal 149 to a structural damage module 147, which monitors the extracted signal 149 to determine if there is structural damage associated with the extracted signal 149. The term "structural damage" is used broadly to include structural change. In examples, structural damage can be the result of seismic action, an intrusion attempt that does not involve seismic action, non-intrusion related seismic activity, such as an earthquake, and deterioration from use. Structural damage module 147 can be implemented in hardware, firmware, software, or a combination thereof. In an embodiment, structural damage module 147 can be a software module that is executed by computer 114. Structural damage module 147 can detect, for example auto-correlated spectrum vibration, which can be analyzed using an algorithm such as Cepstral analysis or the equivalent.

In addition, the structural damage module 147 can compare the extracted signal 149 to data stored in the database 112 and assign a categorization to the extracted signal 149 that indicates whether the extracted signal 149 indicates structural damage or change. The structural damage module 147 can store in database 112 values associated with characteristics of the extracted signal 149 in association with the categorization. The database entry, including the category assigned, can further be confirmed or updated with relevant information. Accordingly, the new database entry can be compared to newly generated extracted signals 149 that are associated with monitor the structure in order to categorize the extracted signals 149.

The selectivity, demodulator, and differential modules 110, 120 and 130 provide a passive mode of the system in that these modules react to detected vibration signals. The amplifier module 140 introduces an active mode by continuously testing and ascertaining structural integrity (i.e., structural damage).

In the active mode, the 143 reference signal from the lock-in amplifier 142 is amplified through the amplifier 146 and used to drive exciter 144. As a result, the vibration output of the exciter 144, excited signal 145, is propagated and scattered through the structure. This vibration is then detected by the optical accelerometer 200. If no structural damage exists, the detected vibration, amplified signal 105, will be synchronous to the reference signal 143, and steady phase and amplitude values are available from the lock-in amplifier 142. Any drifting of these phase and amplitude values from the lock-in amplifier 142 is indicative of structural damage. If the optical accelerometer 200 becomes detached from the structure under surveillance, the detected vibration, amplified signal 105, will be distinct from and unsynchronized with the reference signal 143, and therefore further indicative of a possible malfunction or sabotage.

The difference between the reference signal 143 and the amplified signal 105 detected by the lock-in amplifier 142 can be designated in terms of phase and amplitude. Accordingly, detected seismic activity can be described in terms of this phase and amplitude.

In the active mode, the threat detection system 100 can detect structural damage that was caused independent from seismic activity. For example, the threat detection system 100 would be capable of detecting an intrusion attempt that used a technology (e.g., a plasma or chemical attack), that may be currently known or not yet developed, which caused structural damage in the structure, e.g., a hole in a structure of an ATM. The selectivity module 110 and differential module 130 may not detect this type of attack, since no vibrational signals would be emitted. However, the vibration scattering of the reference signal 143 due to structural damage can be detected as a change in signal strength (i.e., amplitude) and phase delay values relative to the reference signal 143, and processed by the structural damage processor 147 to determine the nature of the structural damage.

In another example, seismic activity is caused by a benign source, such as an earthquake. Although structural damage sustained by the ATM due to the earthquake would not be detected when operating in the passive mode, the threat detection system 100 would detect the structural damage when operating in the active mode. The selectivity module 110 and differential module 130 would detect the occurrence of the earthquake and would categorize the seismic activity as caused a known source based on similar vibration signals stored in the database 112 that are categorized as benign. Since the seismic activity was caused by a benign source, the alarm would not be activated. However, the structural damage processor would detect the structural damage when operating in the active mode based on a difference in detected signal strength and phase relative to the reference signal 143.

The threat detection system 100 can transmit data to another threat detection system 100 through the structure by using exciter 144 as a first transducer to transform an electrical signal into vibrations. The threat detection system 100 can also function as a receiver by sensing the vibrations produced by an excitation signal output by the other threat detection system 100 and using the optical accelerometer 200 as a second transducer that transforms the sensed vibrations into electrical signals. Additionally, the transmitted signals can be modulated by modulator 148 and received signals can be demodulated by demodulator 120, providing means for stealth communication between threat detection systems 100 that are remote from one another. The demodulators 120 of the respective threat detection systems 100 can identify data included in a transmitted excitation signal 145 and process the signal by computer 114 and/or stored in database 112 or update any parameters e.g., structural damage threshold values as stored in module 147.

The stealth communication with an external threat detection system 100 is enabled by using the first and second transducers, modulation and demodulation. With the availability of stealth communication, the use of radio frequency (RF) transmissions can be avoided. Communication between threat detection systems 100 can be advantageous over using radio frequency (RF) communication, since RF communication can be detected, intercepted, or tampered with, such as by a potential intruder. Furthermore, the structure may be installed in a location, such as a vault, strong room, or deposit boxes formed of metallic material that can act as a Faraday cage and interferes with or blocks RF propagation.

In addition, the computer 114 of the threat detection system 100 can exchange data with an external source, such as a host computer 150, such as for uploading and downloading data, parameters, and/or software instructions. Examples of data that can be exchanged between the threat detection system 100 and the host computer 150 include software updates and/or configuration data for updating and/or configuring the computer 114 and components of the threat detection system 100, such as current source 102, LNA 104, selectivity module 110, demodulator module 120, differential module 130, and seismic active monitor module 140; categorization data stored in database 112 for categorizing the electrical output signal 103 after they have been processed by modules 110, 120, 130, and/or 140, e.g., as being associated with benign or threatening sources; diagnostic data; library data to add to the structural damage module 147; and/or structural reference data for modal analysis. The computer 114 can directly or indirectly couple to the components of the threat detection system 100, such as to transmit configuration data and/or request data. The threat detection system 100 can further transmit to the host computer 150 data stored in database 112 obtained while surveilling the structure.

In an example, modulation can be used when communicating with the host computer 150. Data can be transmitted to the host computer 150 or received from the host computer 150 using 45 degree phase jumps, with each phase jump corresponding to multiples of 45 degrees. When the phase is glided up or down, the frequency changes. Accordingly, modulation and demodulation can use PSK or FSK. When a plurality of the threat detection systems 100 are disposed on the structure, a designated one of the threat detection systems 100 can communicate with the host computer 150. The other threat detection systems 100 can exchange data with the host computer 150 by exchanging data with the designated threat detection system 100.

A chain of communication can be established in which a message is received by the designated threat detection system 100. The designated threat detection system 100 then transmits the message to threat detection systems 100 that are in range of sensing the excitation signal 145 transmitted through the structure by the designated threat detection system 100. The threat detection systems 100 that received the message from the designated threat detection system 100 can also transmit the message to other threat detection systems 100 that were out of range from the designated threat detection system 100. The message can continue to be propagated through the chain to threat detection systems 100 that are remote from the designated threat detection system 100. The exchanged messages can be modulated by the sending threat detection system 100 and demodulated by the receiving threat detection system 100.

Similarly, the chain can operate in the other direction, in which a threat detection system 100 that is remote from the designated threat detection system 100 transmits an excitation signal that is passed through a chain of threat detection systems 100 to the designated threat detection system 100. A protocol can be used, for example, to send messages to an addressed threat detection system 100, to broadcast messages to multiple threat detection systems 100, and/or to send acknowledgements to a sender when a message is received, etc.

The designated threat detection system 100 can be removable from the structure and transported to a host computer 150. Alternatively, the designated threat detection system 100 can be permanently mounted to the structure and communicate with a local or mobile host computer 150. The communication between the threat detection systems 100 and with the host computer 150 can occur below the noise level.

Figure 2:
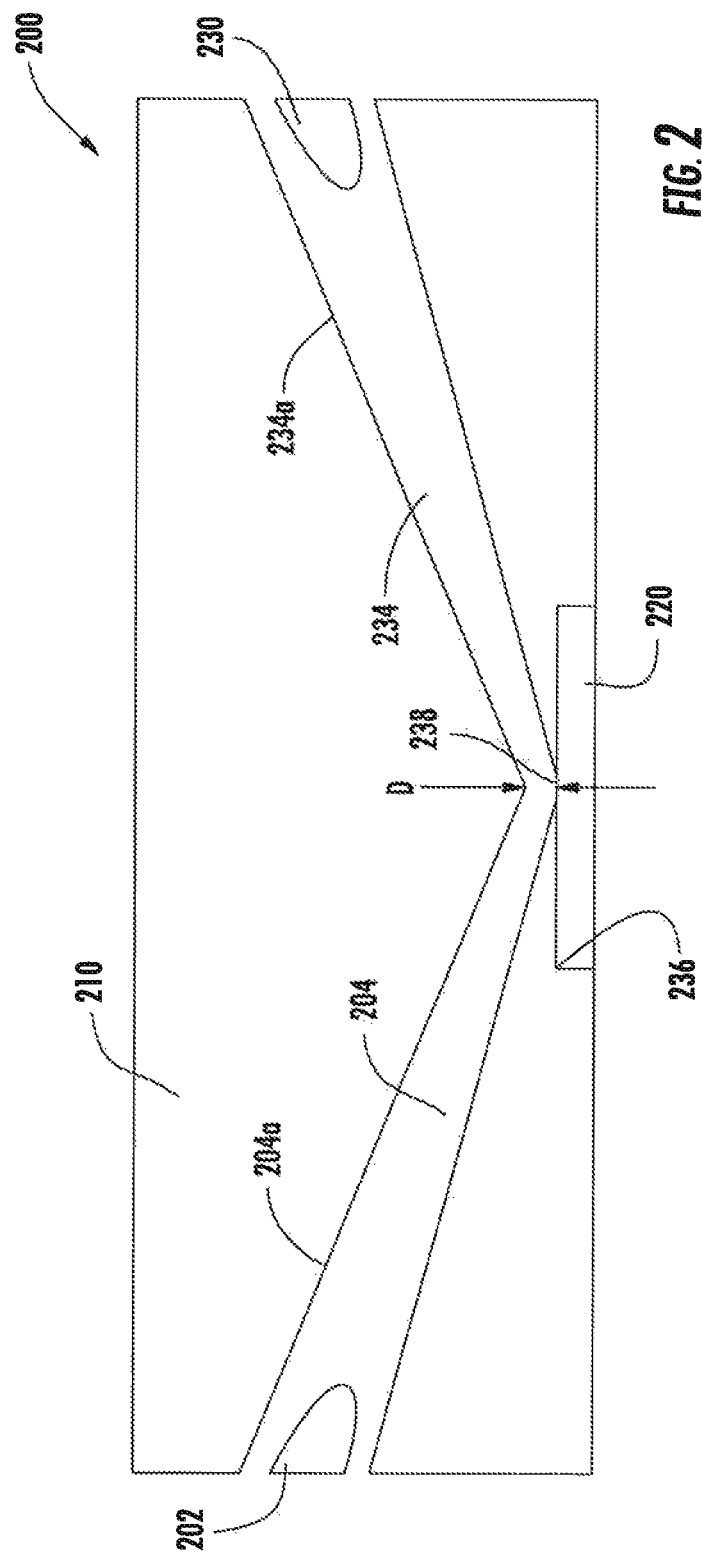
FIG. 2 is a cross-sectional schematic view of the optical accelerometer of FIG. 1, showing a light source, modulator and photoreceiver.

With reference to FIG. 2, the optical accelerometer 200 of the threat detection system 100 is shown. The optical accelerometer 200 is mounted to a structure that is to be surveilled by the threat detection system 100, such as an indoor or outdoor external or internal ATM wall, building wall (including ceilings), vault wall, gun cabinet, sea container, or distribution center wall. The optical accelerometer 200 can be mounted directly to a surface of the structure or can be coupled to the structure via a medium, such as bees wax or epoxy glue. The medium used should be formed of a material that can conduct vibrations from the structure to the optical accelerometer 200.

The optical accelerometer 200 is comprised of a sensor body 210 that is configured to be mounted on the structure. The sensor body 210 includes a first light path 204 and a second light path 234. The optical accelerometer 200 further includes a transducer, which includes a light source 204, a photoreceiver 230, and a modulator 220. The light source 202, such as an LED or laser is provided to direct light through the first light path 204. The photoreceiver 230 is positioned to receive the light that is propagated through the second light path 234.

In order to avoid the influence of electro-magnetic fields and ambient light, the light source 202 may be modulated in a predetermined sequence at either a fixed frequency or a pseudo random frequency, also referred to as the source modulation. Synchronizing the detection of the modulated signal provides for greater detection of vibrational activity and less interferences from electro-magnetic and ambient light. The synchronization and demodulation of the modulated signal can be performed by the computer 114. Alternatively, a lock-in amplifier (not shown) can be used. The lock-in amplifier could be positioned next to LNA 104 to operate on the modulated signal 105 after it is output by lock-in amplifier and before the modulated signal 105 arrives at selectivity module 110, demodulator module 120, differential module 130, and seismic active monitor module 140.

The modulator 220 is formed of a material that is displaced in response to the seismic vibrations, motion speed, or motion acceleration affecting the structure. The modulator 220 is positioned in or near the first light path 204 for modulating the light signal propagating through the first light path 204. The photoreceiver 230 receives the light signal that is modulated by the modulator 220, detects incident light signals and converts the light signals into electrical signals, each having a current or voltage that represents the seismic activities affecting modulator 220 and so represent the seismic vibrations, motion speed, or motion acceleration affecting the structure. The optical axes of the first and second light paths 204, 234 are incident to the modulator 220.

In addition, the first and second light paths can be formed of bores defined through the sensor body 210. The bores can have cross-sections of different shapes. In embodiments, the diameter of the bores can decrease as it approaches the modulator 220 to create a funnel effect and direct light propagating through the bore effectively toward the modulator 220. In embodiments, the bores have cylindrical or conical shapes.

The sensor body 210 can be made from a variety of materials, such as a variety of metals, concrete, marble, plastic, carbon composite, fiberglass, laminates, and a hybrid material formed of a combination of such materials. The material can include a hi-tech laminate that, when acted upon by a drill, provides friction to the rotating drill that impedes rotation of the drill and increases the noise level, extinguishes oxygen, and/or causes an output of fumes that spreads a bad odor. The laminate can be included in order to foil or slow down attacks or to discourage intruders.

The first and second light paths 204, 234 include side walls 204a, 234a that are reflective for radiometric-efficiency of the first and second light paths 204, 234. In this configuration, any seismic activity affecting the structure causes deformation of the modulator 220. The deformation of the modulator 220 affects propagation of the light output by the light source 202 that is received at the photoreceiver 230, causing amplitude and phase modulation of the received light. More specifically, deformation of the modulator 220 changes the light refraction and/or changes the diameter of the first and second light paths 204, 234 located at their junction. The change of refraction or the change in the diameter of the light paths 204, 234 affects the propagation from the light source 202 to the photo receiver 230 and therefore modulates the optical power at the photoreceiver 230. When the diameter at the junction of the first and second light paths 204, 234 is increased, the propagation through the first and/or second light paths 204, 234 decreases, and the optical power at the photoreceiver 230 decreases. When the refraction at the junction of the first and second light paths 204, 234 is of convex deformation, the propagation through the first and/or second light paths 204, 234 converges more, when of concave nature, it converges less. Causing in- and decreasing optical power at photo receiver 230 respectively.

The modulator 220, which can be recess-mounted into a recess 236 of the sensory body 210, can include a deformable, supple, resilient member that functions as a spring. In an embodiment, the recess 236 and modulator 220 can have a circular perimeter, with the modulator 220 having a discoid shape. In other embodiments, the shape of the recess 236 and modulator 220 is not limited to a particular shape. The resilient member can fit snugly within recess 236 and be coupled to the sensor body 210, such as by bonding, e.g., with an epoxy, or fastening, e.g., with mating components. The modulator 220 can be coupled to the sensor body 210 at its distal ends so that a middle portion of the modulator 220 is not coupled to the sensor body 210 and can flex or deflect in response to vibrations or motion. The diameter of the recess 236 and the modulator 220 are substantially the same in order that the modulator 220 can fit snugly within the recess 236, and can range between about 1-10 mm. In an embodiment, the diameter of the recess and the modulator 220 is 1 mm.

The resilient member can be formed of a resilient material, such as steel, aluminum, or the like that can flex in response to a force and resume its original shape when the force is removed. The resilient member can be a spring, such as a steel spring. In an embodiment, the resilient member can be a membrane that has a thickness that ranges between about 10 um and 500 um. In an exemplary embodiment, the membrane has a thickness of 30 µm.

When the structure and optical accelerometer 200 are subjected to seismic activity, a first force is exerted on the resilient member that can cause deformation of the spring. In response to the first force, the resilient member deforms, vibrating in response to seismic activity. At least one of the sidewalls 204a and 234a define a gap 238 positioned at the junction of light paths 204 and 234 directly above the modulator 220 so that a top surface of the resilient member of modulator 220 defines a bottom surface of the light paths 204 and 234 at their junction. When the resilient member deforms and moves relative to gap 238, the diameter D changes at the junction of the first and second light paths 204, 234. During a time period when there is not seismic activity sensed by the threat detection system 100, the diameter of gap 238 ranges between 16λ and diameter D, which is equivalent to approximately between about 5 and 5000 microns.

The spring characteristics associated with the modulator 220, such as the spring constant, are tunable. Properties of the modulator 220 can be selected, such as the materials used and the dimensions, in order to achieve the desirable spring characteristics.

Due to the shape of the first and second light paths 204, 234, light energy is conveyed from the light source 202 towards the resilient member of the modulator 220. The radiometric light intensity may increase due to non-imaging folding of the light rays as they bounce around the inner walls of the light path 204. A funnel effect caused by a decreasing diameter as the light approaches the resilient member can increase or maximize bouncing of light and corresponding incident intensity at the resilient member.

In an embodiment, the first light path 204 converges towards the modulator and the second light path 234 diverges away from the modulator 220. The first light path 204 and/or second light path 234 can have a minimum diameter at an area of the first light path 204 and second light path 234 that is contacted by the modulator 220. This minimum diameter can be 1.0 µm to 1.0 mm. The area of the first light path 204 and second light path 234 with the minimum diameter can further be located at a junction of the first light path 204 and the second light path 234.

The diameter D at the junction of the first and/or second light paths 204, 234 that is proximate the modulator 220 can be selected to optimize response of the light signal arriving via light path 204 to deformation of the modulator 220. Similarly, the diameter of the second light path 234 and the diameter of the first light path 204 can be substantially the same at the area at which the second light path 234 and the first light path 234 intersect. This diameter can further be selected to optimize propagation of the light modulated by the deformations through light path 234 to the photoreceiver 230 for optimal detection of the modulated light. In other words, the minimum diameter is selected to optimize a response in the amplitude of the electrical signal output of the photo receiver 230 to deformation of the resilient member. For example, when 1 mW of light is present at the resilient member and the minimum diameter D is 1 mm, the photoreceiver 230 can detect 1 µW per micron. The photoreceiver 230 can output a signal that can vary by +/−0.5 µA in response to such modulation. On the other hand, when the minimum diameter is 1 micron, the signal output by the photoreceiver 230 can vary by +/−500 µA.

Figure 3:
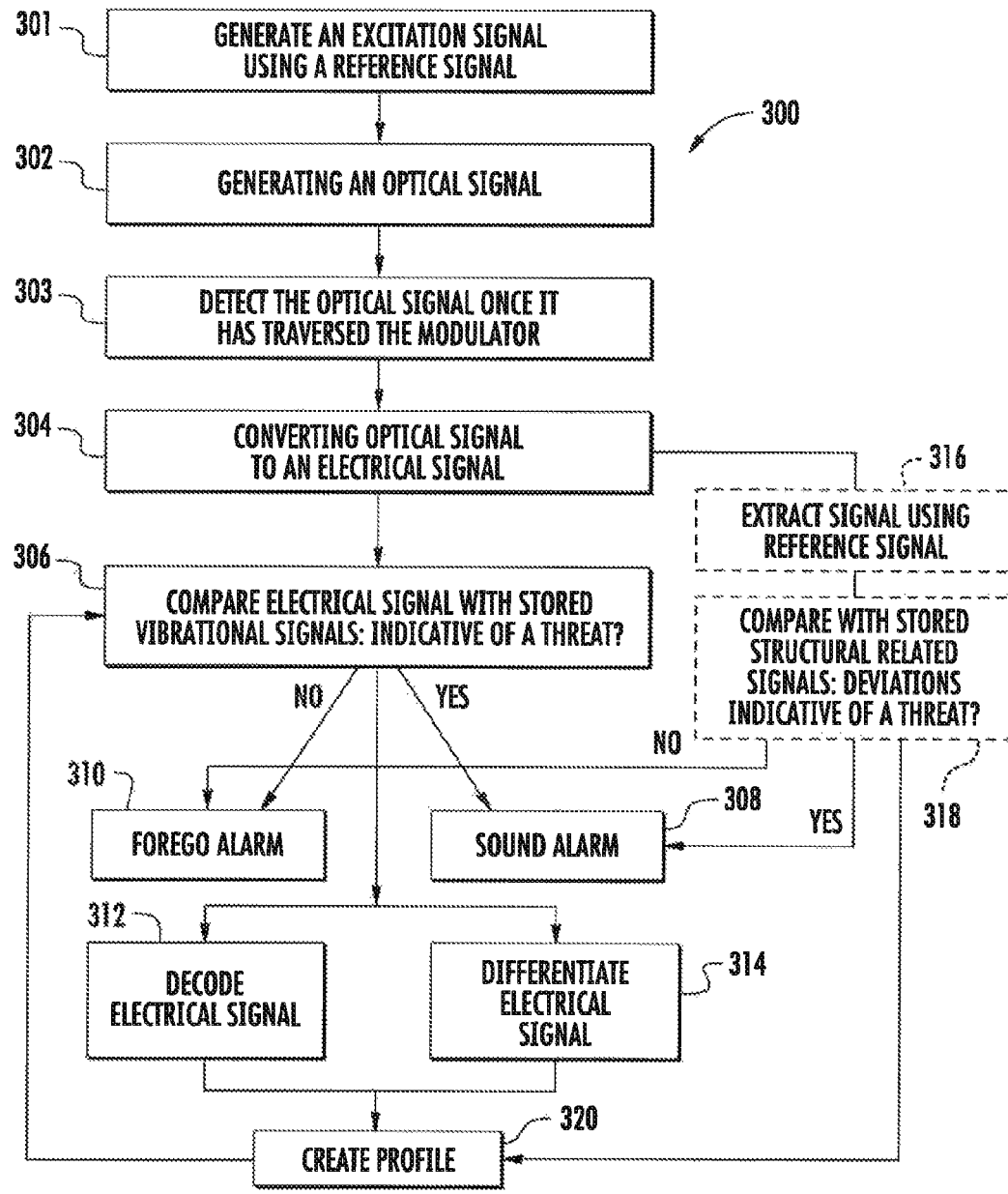
FIG. 3 is a flow diagram of the method of the threat detection system of FIG. 1.

With reference now to FIG. 3, shown is a flowchart demonstrating implementation of the various exemplary embodiments. It is noted that the order of operations shown in FIG. 3 is not required, so in principle, the various operations may be performed out of the illustrated order. Also certain operations may be skipped, different operations may be added or substituted, or selected operations or groups of operations may be performed in a separate application following the embodiments described herein. A method 300 for detecting seismic activity indicative of a threat or a benign source using the system of FIG. 1 is also disclosed and shown in FIG. 3.

The method 300 includes generating an optical signal from an optical accelerometer, e.g., optical accelerometer 200, as shown in operation 302. The optical accelerometer can include a structure, e.g., sensor body 210, housing a light source, e.g., light source 202, a modulator, e.g., modulator 220, and a photoreceiver e.g., photoreceiver 230. The optical accelerometer is mounted onto the structure to be monitored, for example, a vault or an ATM. The light source generates an optical signal. At operation 303, the optical signal is detected after it traverses the modulator that modulates optical signals in response to seismic activity affecting the structure. More specifically, the optical signal propagates from the light source to the modulator. When the optical signal traverses the modulator it is modulated by deformation of the modulator that occurs in response to seismic activity. The modulated optical signal propagates from the modulator to the photoreceiver.

At operation 304, the modulated optical signal is converted to an electrical signal by the photoreceiver. The electrical signal is compared to a plurality of seismic activity (vibrational and motion signals) stored in a database, e.g., database 112, as shown in operation 306. Based on the comparison, a determination is made whether the electrical signal is indicative of a threat or a benign source. If characteristics of the electrical signal are similar to characteristics of signals related to seismic activity that is known to indicate a threat, such as an intrusion or possible attack, for example, an explosion, an alarm, e.g., alarm 116 is activated, as indicated in operation 308. If, however, characteristics of the electrical signal are similar to characteristics of signals related to a known benign source, for example, loud music from a passing car, no action is taken, as indicated in operation 310. In this manner, activation of the alarm can be almost instantaneous with the detection of activity related to a threat.

Operation 302 can include modulating the light signal output by the light source. In an embodiment the light signal is modulated by modulating an electrical signal that excites the light source. Operation 306 can include demodulating the electrical signal and differentiating the electrical signal to identify features of the electrical signal and that can be used to identify a source of the vibrational activity, for example, an explosion, as shown in operations 312 and 314.

The operations 302, 304, 306, 308, 310, 312, and 314 can be performed when operating in a passive mode. Additional operations are added when operating in an active mode. Operations that are specifically associated with the active mode are indicated by dashed boxes. At operation 301, an excitation signal is generated that is based on a reference signal and the excitation signal is applied to the structure. At operation 316, seismic modulation of the electrical signal can be extracted from the electrical signal using the reference signal. At operation 318, amplitude and phase characteristics of the extracted electrical signal are compared to stored information to detect structural damage. If the determination at operation 318 is that structural damage is detected that indicates a possible threat, the alarm is sounded at operation 308. If the determination at operation 318 is that structural damage is not detected, sounding the alarm is forgone at operation 310. Once the electrical signal is compared, decoded, differentiated and/or extracted, a profile is created, as shown in operation 320. The profile is stored in the database to continually improve system behavior.

The threat detection system 100 can operate in different modes so that the alarm is activated under particular conditions. Each mode can be associated with a different set of configurations. In an embodiment, the mode is user selectable. In a high security mode, the alarm is sounded at operation 308 if an indication of a threat is detected at either of operations 306 and 318. In another mode, the alarm is sounded at operation 308 only if an indication of a threat is detected at operation 306. In another mode, the alarm is sounded at operation 308 only if an indication of a threat is detected at operation 318. In another mode, a low security mode, the alarm is sounded at operation 308 only if an indication of a threat is detected at both operations 306 and 318. Furthermore, a plurality of threat detection systems 100 can share information, and a decision regarding activation of the alarm can be based on output from the plurality of threat detection systems 100. Advantages of embodiments of the threat detection system 100 include benefits derived from using an optical accelerometer to detect threats. The optical accelerometer is relatively immune to sounds, including ambient sounds and sounds that can cause a false positive alarm. Optical accelerometers react with the speed of light, do not include toxic substances, e.g., lead, have a high production yield, and are highly reliable.

Operation in the active mode can be performed using a variety of types of accelerometers. A threat that does not produce sound or vibrations can be detected, including an attack that includes an etching or other stealth attack. A structure can be continuously and stealthily monitored.

The methods and systems of the present disclosure, as described above and shown in the drawings, provide for a threat detection system with superior properties including distinguishing between an attack or a benign activity and providing an early warning if an attack is detected. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for measuring seismic activity to detect a threat to a structure, comprising:
    an optical accelerometer configured to be mounted to the structure, the optical accelerometer outputting an electrical signal that represents modulation of light, the modulation of the light being caused by seismic activity affecting the structure; and
    a computer operatively connected to the accelerometer to compare the electrical signal to a plurality of seismic activity signals indicative of seismic activity associated with structures stored in a database for determining whether the electrical signal is indicative of a threat,
    wherein the optical accelerometer comprises:
        a light source to direct light signals through a first light path;
        a modulator formed of a supple, resilient material that deforms in response to seismic activity, the modulator being positioned to modulate a light signal propagating through the first light path in response to the deformation; and
        a photoreceiver positioned in a second light path to receive the modulated light signal;
        wherein the modulator is configured to change a diameter of the first and second light paths located at their junction.

2. The system of claim 1, wherein the first light path and the second light path are conical or cylindrical bores defined through a sensor body.

3. The system of claim 1, wherein the first light path converges towards the modulator and the second light path diverges away from the modulator.

4. The system of claim 1, wherein a gap is defined in an exterior wall of at least one of the first light path and the second light path, and a top surface of the modulator defines the diameter of at least one of the first and second light paths.

5. The system of claim 1, wherein the light source is modulated to cause the light signals generated by the light source to be distinguishable from ambient light.

6. The system of claim 1, wherein the computer assigns the electrical signal output by the optical accelerometer a categorization that indicates whether the electrical signal is a threat or a benign source, and stores values associated with characteristics of the electrical signal output by the accelerometer in the database as a seismic activity signal in association with the categorization.

7. The system of claim 1, wherein the computer is configured to activate an alarm when the computer determines that the light signal indicates a threat.

8. An optical accelerometer comprising:
    a body configured to be mounted to a structure; and
    a transducer to output an electrical signal that represents modulation of light, the modulation of the light being caused by seismic activity affecting the structure,
    wherein the transducer comprises:
        a light source to direct light signals through a first light path;
        a modulator formed of a resilient material that is configured to deform in response to seismic activity, the modulator positioned so that when a light signal propagates through the first light path, the modulator is configured to modulate the light signal in response to the deformation; and
        a photoreceiver positioned in a second light path to receive the modulated light signal and output an electrical signal that represents the modulated light signal;
        wherein the modulator is configured to change a diameter of the first and second light paths located at their junction.

9. The optical accelerometer of claim 8, wherein the first light path and the second light paths are conical or cylindrical bores defined through a sensor body.

10. The optical accelerometer of claim 8, wherein the first light path converges towards the modulator and the second light path diverges away from the modulator.

11. The optical accelerometer of claim 8, wherein an exterior wall of at least one of the first light path and the second light path defines a gap, and a top surface of the modulator defines the diameter of at least one of the first and second light paths.

* * * * *